Patented Aug. 2, 1932

1,869,608

UNITED STATES PATENT OFFICE

CLARKE C. MILLER, OF WHITING, INDIANA, ASSIGNOR TO STANDARD OIL COMPANY, OF WHITING, INDIANA, A CORPORATION OF INDIANA

ART OF PREPARING LUBRICATING OIL

No Drawing.        Application filed October 21, 1925.   Serial No. 64,022.

The present invention relates to improvements in imparting standard characteristics to lubricating oils of similar properties derived from varied sources or produced by varied methods of manufacture.

In the production of lubricating oils in many refineries, the crude oil employed or the method of manufacture and refining frequently results in the production of an oil which, although the same as a given standard as regards viscosity and other essential characteristics as a lubricant, may depart considerably in color characteristics, both by transmitted and reflected light, from the recognized standard. In accordance with the present invention, a means is provided whereby such oils may be made uniform with the standard in color characteristics as well as in viscosity and other essential physical characteristics. The widest variance in color is frequently found in those oils of heavy viscosity, which are ordinarily produced by blending a carefully refined reduced crude or cylinder stock with wax-free paraffin oils, and others of similar characteristics which may be made by distillation from oil, for example, under vacuum. The former product, which is accepted as standard, may have a comparatively deep color and a marked greenish bloom, whereas the latter product, essentially similar from the lubricating oils standpoint, may have a comparatively light color and substantially no bloom. It is desirable that the lighter colored products be imparted the deeper color and the bloom of the standard product without deleteriously changing their lubricant characteristics.

In accordance with this invention, this may be accomplished in the following manner:

In the refining of reduced crude oils or cylinder stocks, as a step in the process, they are passed through filters of fullers' earth, in which a deposit of highly colored material takes place. When the fullers' earth is spent, a portion of the highly colored material in the body of the fullers' earth may be removed by washing with naphtha. The material dissolved out by the naphtha includes asphaltene-like bodies, which are probably produced, at least to a considerable extent, by polymerization or oxidation within the fullers' earth. These bodies I designate hereinafter as asphaltene-like polymerization products. On evaporation of the naphtha from the extracting wash they are left as a pitch-like material. I may, as hereinafter pointed out, employ these naphtha extracted asphaltene-like bodies without further treatment. I prefer, however, to further extract them with ethylene dichloride, a mixture of benzol and alcohol containing 5 to 50% of alcohol or an ether-alcohol mixture containing 50 to 75% of alcohol. In each case, the extracting liquid, with its dissolved constituent, is heated to remove the menstruum, and the residue employed in accordance with this process. Instead of employing naphtha to extract the asphaltene-like polymerization bodies from the fullers' earth, I may employ a mixture of benzol and alcohol containing 5 to 50% of alcohol, subsequently evaporating the solvent and employing the residue.

In accordance with this invention, the asphaltene-like polymerization bodies are added to the oil to be treated in proportion to give the desired standard color. For example, a certain heavy lubricant of about 300 sec. viscosity Saybolt at 100° F. has a color of approximately 96 on the true color scale (see Industrial and Engineering Chemistry, Volume 14, page 269). An oil of like characteristics, obtained by distillation with large quantities of steam, was found to have a color of approximately 16 on the true color scale. By adding to the latter 105 to 110 grams per gallon of the asphaltene-like bodies hereinbefore described, resulting from evaporation of the naphtha wash, the desired color of approximately 96 is obtained, and at the same time, a bloom substantially equivalent to that of the standard oil was imparted thereto. By employing the ethylene dichloride soluble constituents, similar results were obtained by the use of 65 to 75 grams thereof per gallon of oil. Approximately 15 grams of the residue from a benzol alcohol wash of the spent fullers' earth produced similar results. In each case there was a slight increase in carbon indicated by the Conradson carbon test upon the oil product; but in no case did the Conradson carbon test of the treated oil show a product having over 0.25% carbon, this being substantially less than the carbon content of the standard oil, as shown by the Conradson test.

I have also found that essentially similar results may be obtained by employing the asphaltene-like conversion or polymerization products formed during pressure distillation of hydrocarbon oils to effect their conversion into lighter oils. Thus, by diluting pressure tar with from 2 to 10 times its volume of naphtha, chilling and settling the mixture, asphaltene-like conversion products are secured which may be added to light colored lubricant oils to secure standard color and bloom therein. It is preferred, however, that the conversion or polymerization bodies derived from spent fullers' earth be employed, as the color and bloom imparted by them appear somewhat more stable than that imparted by the products derived from pressure tar.

I claim:

1. The method of imparting standard color and bloom to unduly light colored lubricating oils which comprises adding thereto asphaltene-like polymerization bodies derived from hydrocarbon oils.

2. The method of imparting standard color and bloom to unduly light colored lubricating oils which comprises adding thereto asphaltene-like conversion bodies derived from spent fullers' earth through which hydrocarbon oils have been filtered.

3. The method of imparting standard color and bloom to unduly light colored oils which comprises adding thereto naphtha soluble materials derived from spent fullers' earth through which hydrocarbon oils have been filtered.

4. The method of producing a heavy lubricating oil of standard characteristics and of reduced carbon content which comprises subjecting a heavy oil to distillation with steam, thereby producing a heavy viscous distillate oil, and incorporating in the latter a small proportion of asphaltene-like polymerization bodies derived from hydrocarbon oils.

5. A fluorescent, heavy, distillate lubricant oil containing a small proportion of asphaltene-like polymerization bodies derived from hydrocarbon oils, said oil having a Conradson carbon test of not over 0.25% carbon.

6. A fluorescent lubricant oil of about 300 sec. viscosity Saybolt at 100° F. and having a color of approximately 96 on the true color scale and a Conradson carbon test of not over 0.25%, said oil containing 105 to 110 grams per gallon of asphaltene-like conversion bodies derived from spent fullers' earth through which hydrocarbon oils have been filtered.

CLARKE C. MILLER.